July 31, 1956 M. C. VOSBURGH 2,757,279

TWO-WAY COMMUNICATION SYSTEMS

Filed Nov. 20, 1951 3 Sheets-Sheet 1

INVENTOR
MALCOLM C. VOSBURGH
BY Elmer J. Gorn
ATTORNEY

July 31, 1956 M. C. VOSBURGH 2,757,279

TWO-WAY COMMUNICATION SYSTEMS

Filed Nov. 20, 1951 3 Sheets-Sheet 2

INVENTOR
MALCOLM C. VOSBURGH
BY [signature]
ATTORNEY

INVENTOR
MALCOLM C. VOSBURGH
BY Elmer J. Gorn
ATTORNEY

United States Patent Office 2,757,279

Patented July 31, 1956

2,757,279

TWO-WAY COMMUNICATION SYSTEMS

Malcolm C. Vosburgh, Newton, Mass., assignor to Raytheon Manufacturing Company, Newton, Mass., a corporation of Delaware Application November 20, 1951, Serial No. 257,290

10 Claims. (Cl. 250—6)

This invention relates to a master-slave system for two-way communication using a single generator scheme and particularly relates to a master-slave communication system comprising two physically separated stations with control means for adapting either station to operate as a master station and the other station to operate simultaneously as a slave station, regardless of whether or not the slave station is transmitting.

In a microwave or, in fact, any communication system, it is desirable that the transmitter frequency and the receiver local oscillator frequency be held so stable that no returning of either is required to permit satisfactory communication whenever desired. In the lower frequency bands, the above requirement is satisfied by using crystal controlled oscillators. At microwave frequencies, however, this is usually a difficult requirement so that one must tolerate some drifting or frequency misalignment between the transmitter and the receiver. One means of establishing communication under these conditions is to assume a moderate frequency misalignment, then to leave the transmitter alone and to search the neighboring frequency region with the receiver until the transmitter signal is picked up, and then to lock, by some orthodox automatic frequency controlled means, the receiver to the incoming frequency.

If the frequency misalignment is allowed to be large as a result of poor transmitter and receiver design, the frequency searching excursion of the receiver must be made very great. The result is complication of receiver design and a possibility of locking on an undesired signal in an adjacent channel. If the stability of the transmitter and receiver is poor, it becomes necessary to use wide band receivers in order to accept two signals of widely fluctuating frequencies. Wide band microwave receivers are characterized by excessive noise and a very limited range over which communication is possible. One successful, though complicated, scheme for avoiding this difficulty is to independently stabilize both transmitter and receiver by means of reference cavities and then search for any residual frequency misalignment by means of a sweep on the second local oscillator of a double superheterodyne receiver. This provides a double problem of wide band input circuits to the receiver and wide frequency swing capabilities (percentage wise) in the second local oscillator.

An improved approach to the problem of providing adequate reception at microwave frequencies without a wide band receiver is to search the frequency of a reference device, such as a cavity resonator, to which the receiver local oscillator is tied.

In prior two-way communication systems utilizing a single generator scheme and having automatic frequency control circuits at each station, it has been practically impossible to maintain frequency stability in the system since both stations are trying to lock in on another. If there should be a drift in the assigned frequency of any one station, the other station will follow; the change in frequency of said other station will produce a corresponding change in frequency of said one station, and so forth. In other words, there will be a tendency for the system to continuously drift in the direction of the original drift over a considerable portion of the frequency spectrum. In order to prevent these two stations chasing one another across the frequency spectrum, the A. F. C. voltage must be removed from the station which is to act as master station. In the circuit according to this invention, control means are provided for selecting either station as the master station and for removing any A. F. C. voltage from that station.

A single generator scheme is incorporated in the communication system according to this invention. The single generator scheme refers to a combined transmitter-receiver having a single oscillator which not only provides power for the transmitter, but also serves as a local oscillator for the receiver. This single generator system is advantageous in that only a single microwave oscillator is needed instead of the usual pair of inherently unstable and costly microwave oscillators. This scheme requires that the received and transmitted frequencies differ always by the intermediate frequency of the receivers.

An object of this invention is to provide a two-way communication system which is capable of satisfactory reception at the receiving station in spite of appreciable fluctuations in frequency at the transmitting station and at the local oscillator of the receiver and without resort to an ineffective broad band receiving means.

Another object of this invention is to provide a two-way communication system having a receiver and transmitter at each of two stations, either of which is capable of acting as the master station, depending on the position of simple control circuits installed at each station.

Other and further advantages of this invention will be understood from the following exemplifications of my invention, reference being had to the accompanying drawing, wherein.

Figure 1:
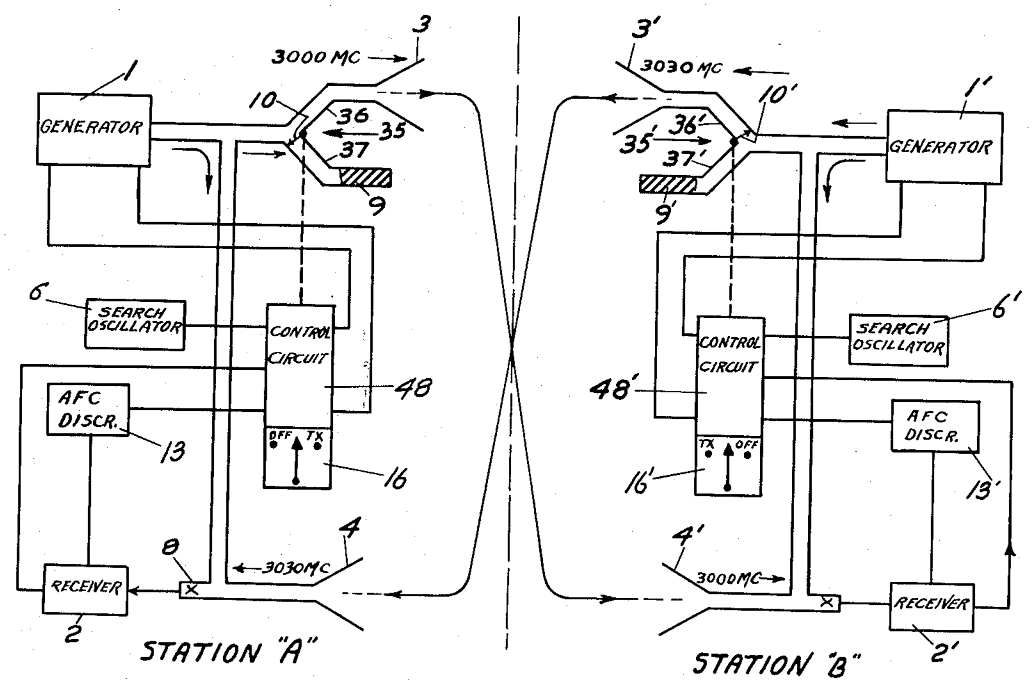
Fig. 1 is a block diagram of the basic two-way communication system embodying the invention.

The two-way communication system according to this invention comprises two stations, A and B, each of which includes a transmitting portion and a receiving portion. Both stations are identical except that their nominal assigned frequencies differ by the intermediate frequency of either receiver. Each station has a control circuit and an associated "transmit" switch which is closed whenever it is desired to transmit from that station. A single generator at each station functions both as a master oscillator for the transmitting portion of the station and as a local oscillator for the receiving portion of the same station. The generator is connected either to a transmitting antenna or to a dissipative load. If the "transmit" switch is in the open or "off" position, the corresponding generator is connected, by means of the control circuit, to the dissipative load, and that station can receive but cannot transmit. The details of said control circuit will be described later. A search oscillator at each station operating at a frequency of approximately 20 cycles per second is applied to the frequency determining element of the corresponding generator to search its frequency over a predetermined range. The control circuit of each station is responsive to the opening of the "transmit" switch and the absence of received signals to connect the search oscillator to the corresponding generator, thereby causing the corresponding station receiver to search about its nominal assigned frequency. An automatic frequency control voltage is derived from a discriminator or A. F. C. circuit which is connected to a portion of the receiver whenever signals are received from the transmitting portion of the other station. By means of the control circuits and "transmit" switches at both stations, it is possible to make either station A or station B the master station and to have the other station follow the frequency fluctuations of the master station. If one station is made the master station, the other or slave station continues to search until a frequency equal to the instantaneous frequency of the master station plus or minus the intermediate frequency of the slave station receiver is reached during the excursion in frequency of the sweep oscillator. Then the control circuit is effective to disconnect the search oscillator from the slave station generator and to connect the automatic frequency control voltage to the slave station generator, thereby causing the slave station to remain locked on the master station. If the master station frequency is higher than the frequency of the slave station by the intermediate frequency of the slave station receiver, one polarity of the A. F. C. discriminator is required; the polarity of the discriminator must be reversed if the master station frequency is lower than the slave station frequency by the intermediate frequency. The search oscillator and automatic frequency control voltages are disconnected from the generator of the master station by means of the control circuit and associated "transmit" switch so that the master station is free to operate at its own frequency, which is equal to or close to its assigned frequency. It is thus apparent that, by means of this invention, the station set up by the control circuitry as the slave station will automatically follow the master station, even in spite of considerable drifting in frequency of the master station. The frequency control of the station generators may be effected by applying the search oscillator voltage and the A. F. C. voltage directly to the generators, or by applying said voltages to the tuning means of some frequency reference device to which the generators are coupled.

Referring now to Fig. 1, the elements of station B corresponding to those of station A are represented by the same numerals carrying a prime. The two-way communication system comprises two stations, A and B, which are physically separated from one another and identical except for the fact that the nominal frequency of the oscillators of the two stations differ by the intermediate frequency of the receivers. Since the invention is particularly adapted to communication systems operating at microwave frequencies, microwave components are illustrated in the drawing; the principles of this invention, however, are not necessarily limited to any particular frequency band. As previously stated, a single generator system is employed in the communication system according to this invention. Generator 1 of station A, which may be any source of high frequency oscillations, such as reflex klystron, is connected by means of a transmission line to a waveguide branching means 35, having one branch 36 connected to a transmitting antenna 3, and the other branch 37 connected to a dissipative load 9.

Station A has a "transmit" switch 16 and a control circuit 48, the operation of which will be fully described in connection with the explanation of the circuit of Fig. 3. When "transmit" switch 16 is closed or moved to the "TX" position, the control circuit 48 is so actuated that the R. F. switch 10 assumes the position shown in Fig. 1. Generator 1 therefore feeds the transmitting antenna 3 through branch 36, and station A radiates energy. With switch 16 open, however, control circuit 48 is so actuated that switch 10 blocks off branch 36 and, instead, permits generator 1 to feed dissipative load 9. Likewise, generator 1' of station B may be connected with the transmitting antenna 3' or to dissipative load 9', depending on the position of R. F. switch 10'. Search oscillators 6 and 6' located at stations A and B, respectively, are connected to their respective generators 1 and 1' whenever the corresponding "transmit" switches 16 and 16' are open and no signals are being received by the corresponding station. An automatic frequency control voltage is derived at the output of the A. F. C. discriminator 13 of receiver 2 whenever signals are being received from station B. This automatic frequency control voltage is applied to generator 1 provided switch 16 is in the open or "off" position.

Suppose that the "transmit" switches of both stations are open. In accordance with the previous explanation, both generators 1 and 1' are caused to search about their nominal assigned frequency by means of search oscillators 6 and 6' connected, respectively, to corresponding generators 1 and 1'. Now suppose that the "transmit" switch 16 at station A is closed. This causes R. F. switch 10 to connect generator 1 to its transmitting antenna 3 and causes the control circuit 48 to remove the search voltage derived from said search oscillator from generator 1. The latter is now operating freely at some frequency determined only by the parameters of the frequency determining elements, which depend, in turn, on such factors as electrode supply voltages, temperature, humidity, and so forth. The search receiver 2' at station B will pick up the signal being transmitted from station A, say, 3,000 mc. The intermediate frequency will be assumed to be 30 mc. Once the signal from station A is picked up, that is, when the frequency of generator 1'—now acting as local oscillator for receiver 2'—reaches 3030 mc., the control circuit 48' is adapted, in a manner to be shown infra, to disconnect the search voltage from generator 1' and to supply an A. F. C. voltage, derived at 13', to generator 1'; in this way, receiver 2' at station B is locked on the transmitted signal from station A. If the frequency of generator 1 were to shift to 3001 mc., the receiver at station B would be locked in at this new frequency by means of the A. F. C. voltage derived at 13'. In other words, station A is the master station and station B is the slave station which automatically follows the transmitter frequency-wise. The frequency values recited are merely illustrative, and the invention is not limited to any particular frequency band.

If the "transmit" switch 16' at station B is now closed, the R. F. switch 10' at station B will be so positioned by control circuit 48' as to connect generator 1' to its transmitting antenna 3'. Since the receiver of station B is automatically locked on the frequency of station A, that is, generator 1' is tuned to 3030 mc., it is left in that condition. Generator 1' will transmit a signal of 3030 mc. which can be received by station A's receiver.

If the "transmit" switch 16 at station A is opened while station B is transmitting, the transmission at station A ceases, and, since station B is no longer receiving signals from station A, the A. F. C. voltage is removed from station B, unlocking receiver B. Station B's generator now drifts to its own free running frequency. The energy radiated from antenna 3' of station B is of a frequency close to, but not necessarily equal to, the assigned or center frequency of station B. Control circuit 48 at station A, in the absence of signals from station B, is so actuated as to cause search oscillator 6 to search the generator frequency in a manner to be described later, until a frequency equal to the frequency of energy radiated from antenna 3' plus or minus the intermediate frequency is reached, whereupon the receiver of station A locks on station B in the manner previously described when station A was the master station. Now B has become the master station and A, the slave.

From the above analysis, it is clear that, if neither station is transmitting, the station which first closes its "transmit" switch is always the master station, while, if both stations are transmitting, the station which first opens the "transmit" switch becomes the slave station.

Figure 2:
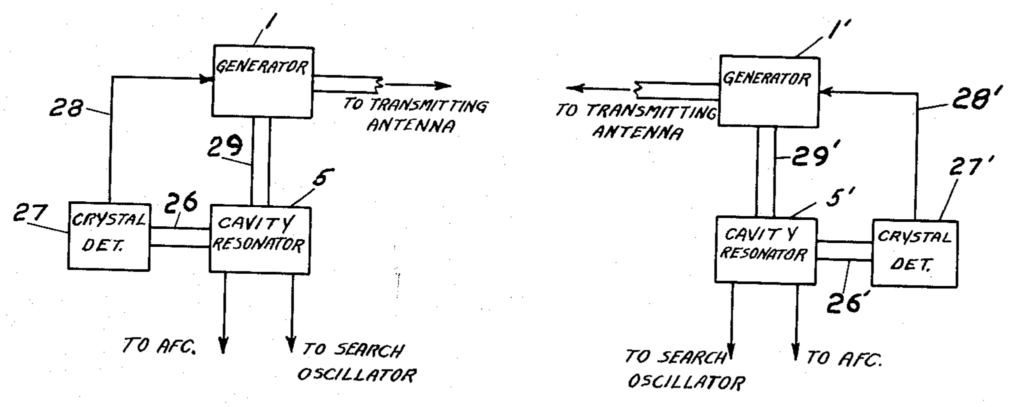
Fig. 2 is a block diagram showing the modifications of Fig. 1.

Referring to Fig. 2, a modification of the circuit of Fig. 1 is shown. In the system according to Fig. 1, the search and A. F. C. voltages are applied directly to the generator. Although a receiver can be made to follow the transmitter by means of this system, it is not always satisfactory at microwave frequencies inasmuch as the microwave generator is not inherently stable and the frequency misalignment between the transmitter and receiver may become so large that the frequency searching excursion of the receiver must be made very great, with resulting complications of receiver design and possibility of locking on an undesired signal from a station in an adjacent frequency channel. In addition, the drift in the receiver local oscillator should be minimized so as to cut down on the search range required. To obviate this difficulty, an arrangement according to Fig. 2 is devised. A frequency reference means 5 samples some of the output of generator 1 and feeds back to the generator an error voltage which holds the frequency of the generator to the frequency of the frequency reference means. The expression "frequency reference means" refers to any means external to the generator whose frequency is to be controlled and having a predetermined relatively fixed frequency which is coupled to said generator and produces an output proportional to the difference in frequency between said generator and said reference means which is fed back to said generator to maintain its frequency equal to that of the reference means. One form of frequency reference means is shown in Fig. 2. This arrangement differs from that of Fig. 1 in that each generator is loosely coupled by means of a waveguide or other transmission line 29 to a cavity resonator 5 tuned to the assigned frequency of the station of which it is a part, in this case, 3,000 mc. The cavity resonator is electromagnetically varied in size as a function of the A. F. C. and search voltages applied thereto. As the cavity is thus modulated, its resonant frequency varies and the variable output of said cavity resonator is detected by means of a crystal detector 27, and fed back to the generator. The feedback connection 28 may, for example, be connected to the repeller electrode of a reflex klystron oscillator. Cavity 5 has a very high value of Q compared to that of generator 1 to enhance the frequency stabilizing effect of the cavity on generator 1. If the frequency of generator 1 tends to drift excessively, the high output from the resonator will change and the voltage fed back to the generator will restore its frequency to a value at least close to the nominal value. Similarly, generator 1′ at station B will be coupled to a high Q cavity resonator 5′ having a detector 27′ and connections 28′ in the feedback path to the generator. At extremely high frequency of the order of 10,000 mc., the frequency of generator 1 will still drift, even with the arrangement of Fig. 2, but the drift will be considerably reduced.

Figure 3:
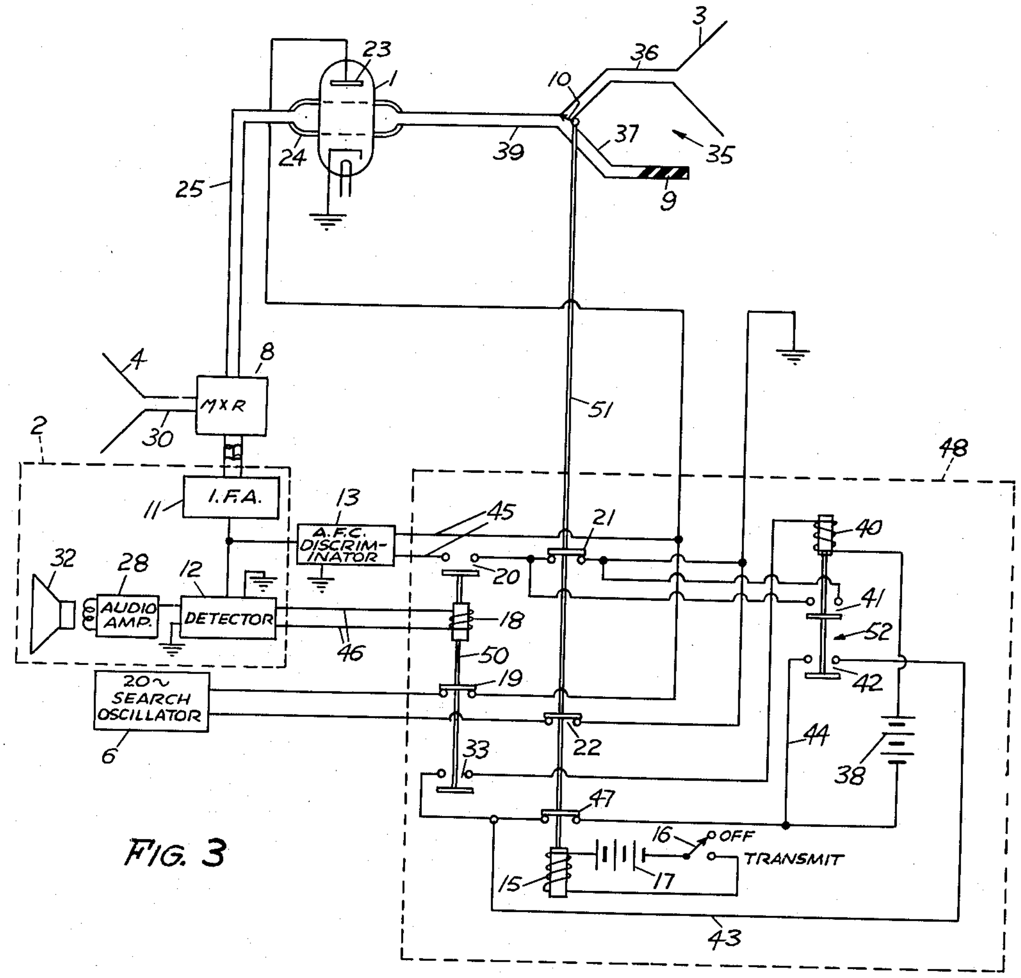
Fig. 3 is a schematic illustration of a single station of the basic system shown in Fig. 1.

Referring now to Fig. 3, a detailed description of a single station, as used in the system of Fig. 1, is shown. An oscillation generator 1 functions both as a master oscillator for the transmitting portion of the station and as the local oscillator for the receiving portion 2 of the same station. A search oscillator 6 serves to sweep the frequency of generator 1 over a range of approximately one-tenth of one per cent. of the assigned frequency of generator 1 at a twenty-cycle rate by connecting the output of the search oscillator directly to said generator. In the example shown in Fig. 3, generator 1 is a reflex klystron and the search voltage is applied to the repeller electrode 23. Other types of oscillators may be used with this invention, however. A wave guide 39 couples the cavity 24 of generator 1 to the branching section 35. Branch section 35 includes a first branch 36 terminating in a horn type radiator 3 and a second branch 37 terminating in a dissipative load 9. Load 9 has about the same impedance as antenna 3 and functions to maintain the load on generator 1 relatively constant regardless of whether the station is transmitting or receiving. Generator 1 is also connected by way of a wave guide transmission line 25 to a wave guide crystal mixer 8. Receiving antenna 4 is also connected to mixer 8 by means of wave guide section 30. The output of the mixer is amplified by an intermediate frequency amplifier 11 which is followed, in turn, by a conventional detector 12, audio amplifier 28 and speaker or other translating device 32. A conventional A. F. C. discriminator-detector 13, connected to the output circuit of the intermediate frequency amplifier, provides an A. F. C. voltage which appears across leads 45. The output of the A. V. C. portion of detector 12 is coupled by leads 46 to an "A. V. C." relay 50 comprising a coil 18 and contacts 19, 20 and 33. A "master" or transmitting relay 51 made up of a coil 15, a D. C. supply such as a battery 17, "transmit" switch 16, R. F. switch 10 and contacts 21, 22 and 47 turns on or off the A. F. C. and search voltages and operates R. F. switch 10 to connect generator 1 either to antenna 3 or to dissipative load 9, in a manner described later. Relay 52 is a holding relay whose function is to insure that the A. F. C. voltage is removed from the master station whenever both master and slave stations are simultaneously transmitting and receiving.

It should be understood that the circuit of Fig. 3 represents only one station and that another identical station exists at another location. To facilitate the explanation of the operation existing simultaneously at both stations A and B, reference characters bearing a prime will be used to denote the elements of station B corresponding to those of station A. For example, reference character 6 will refer to the search oscillator of station A and 6′ to the search oscillator of station B, and so forth.

Firstly, it will be assumed that both "transmit" switches 16 and 16′ of master relays 51 and 51′ are open. Both R. F. or wave guide switches 10 and 10′ are so positioned that oscillations from generators 1 and 1′ are fed, respectively, through branches 37 and 37′ of branching sections 35 and 35′ to dissipative loads 9 and 9′. Thus, neither station is transmitting and neither station is receiving from the other. Coil 18 of A. V. C. relay 50 is thus deenergized, switch 20 is open and no A. F. C. voltage is applied to generator 1. Switch 22 is closed since coil 15 is deenergized and, inasmuch as there is no incoming signal at receiving antenna 4, switch 19 is closed. A search voltage from oscillator 6, therefore, is applied to generator 1. For similar reasons, the switches 22′ and 19′ at station B are also closed and, consequently, both generators 1 and 1′ are searching about their center frequencies from the action of the search oscillator being applied to the frequency responsive repeller electrodes 23 and 23′, respectively.

Secondly, if the "transmit" switch 16 of master relay 51 of station A is now closed, coil 15 will be energized and switch 22 will open, removing the search voltage from the repeller electrode 23 of generator 1 at station A. The R. F. switch 10 of station A is actuated so as to block off energy flow from generator 1 into the dissipative load 9 and so that energy from generator 1 will be fed through wave guide branch 36 to transmitting antenna 3. Station A is now transmitting freely at a frequency in the vicinity of its assigned frequency, the exact frequency depending on such factors as electrode voltages, temperature, humidity, etc. Simultaneously, station B is still not receiving since its receiver is not tuned to station A. Since there is still no output at detector 12′, 18′ remains deenergized and switch 20′ remains open. There is, therefore, no A. F. C. on generator 1′. Switch 19′ and 22′ both remain closed, however, and a search voltage continues to be applied to generator 1′. When the frequency of generator 1′ becomes equal to that of the transmitted signal from station A plus or minus the receiver intermediate frequency, the intermediate frequency amplifier 11′ passes a signal and an output is obtained at detector 12′. Coil 18′ is now energized, opening switch 19′ to remove the search voltage and closing switches 20′ and 33′. Coil 15′ is still deenergized so switch 21′ is closed and an A. F. C. voltage is connected through switches 20′ and 21′ to generator 1′. The A. F. C. voltage continues to be applied to generator 1′ to lock the receiver of station B on station A, regardless of fluctuations in the latter's transmitted frequency. Thus, station A has become a master station and B, a slave station. Since switch 33′ and 47′ are both closed, coil 40′ of holding relay 52′ is energized through a path comprising one side of coil 40′, switch 33′, switch 47′, battery 38′ and the other side of coil 40′, in that order. Switches 41′ and 42′ are thereby closed.

Thirdly, if the "transmit" switch 16′ of relay 51′ of station B is closed while station A is still transmitting, coil 15′ becomes energized and switches 21′, 22′ and 47′ open. A signal is still received from station A and therefore coil 18′ remains energized and switches 20′ and 33′ remain closed. Switch 19′ is already open to disable the search voltage applied to generator 1′, so the fact that switch 22′ opens is immaterial. Although switch 47′ is now open, coil 40′ of holding relay 52′ is still energized through a path comprising one side of coil 40′, switch 33′, lead 43′, switch 42′, lead 44′, battery 38′ and the other side of coil 40′, in that order. Since holding coil 40′ is still energized, switch 41′ remains closed, thereby shunting or by-passing the now open switch 21′ and providing a closed path through switches 20′ and 41′ for applying the A. F. C. output of discriminator 13′ to generator 1′. In other words, an A. F. C. voltage is still applied to station B even though the "transmit" switch 16′ of relay 51 of station B is closed while station A is transmitting. At station A, switch 16 remains closed so that contacts 21, 22 and 47 remain open. Since station A is now receiving from station B, a signal is received at 4 and coil 18 of A. V. C. relay 50 is energized, thereby closing switches 20 and 33 and opening switch 19. Since it is desired that station A remain master in spite of the fact that station B is also transmitting, generator 1 should not be varied but station A's transmitter should continue to run freely. Since switches 19 and 22 are open, there is no search voltage on generator 1. Since switch 33 was open because station A has not been receiving from station B and since switch 47 was also open, holding coil 40 of relay 52 is not energized, therefore, no by-passing of subsequently closed; there is, therefore, no by-passing of the now open switch 21. The A. F. C. voltage, as well as the search voltage, is thus removed from generator 1 and the transmitter of station A is permitted to continue running freely; that is, station A is still master even though station B is also transmitting.

Fourthly, if switch 16 of station A is now opened, its transmission ceases. Since there is no longer any signal radiated at station A for station B to lock on, there is no output from detector 12′, coil 18′ becomes deenergized, closing switch 19′ and opening switches 20′ and 33′. Since the station B master relay 51′ is still energized, switches 21′, 22′ and 47′ remain open. Since switches 33′ and 47′ are now both open, holding relay 52′ is deenergized and there is no by-passing of open switch 21′. This, plus the opening of switch 20′, assures the removal of A. F. C. voltage from station B. Since switch 22′ is already open because of the energization of coil 15′, there is no search voltage present at generator 1′. Therefore, station B begins transmitting freely at some frequency of its own. At the same time, at station A switches 21, 22 and 47 become closed because of the opening of switch 16. No signal is being received at 4 from station B since station B has drifted from its previously locked-in frequency so coil 18 becomes deenergized. Switch 19 closes and, inasmuch as switch 22 is already closed owing to station A's "transmit" switch 16 being open, a search voltage is applied to generator 1. Switch 20 of deenergized A. V. C. relay 50 opens; there would, however, be no A. F. C. voltage applied anyhow since receiver 2 is not receiving energy from station B. As soon as generator 1 reaches the frequency at which station B is freely running, receiver 2 picks up station B's signal and an A. V. C. output appears across leads 46. Coil 18 being now energized, switch 19 opens to remove the search voltage from generator 1 and switch 20 closes to apply the A. F. C. from discriminator 13 to generator 1. Switch 33 closes also and, with both switches 33 and 47 closed, coil 40 becomes energized and switches 41 and 42 close. From the above description, it is apparent that station B has now become the master station while station A becomes the slave.

Fifthly, if switch 16 of station A is closed with station B still transmitting, station A is still locked on station B, coil 18 is still energized and switches 20 and 33 remain closed. The holding coil 40 is still energized from the previous condition and closed switch 41 by-passes now open switch 21 to retain A. F. C. on generator 1; station A is still locking on station B. Switch 33′ was open owing to the fact that station B was not receiving from A prior to closing of switch 16. Holding relay is inoperative and open switch 21′ is not by-passed by 42′ and A. F. C. remains removed from the master station (station B).

Finally, if switch 16′ at station B is opened, station B ceases to transmit, station A can no longer lock on it, coil 18 is deenergized, switch 20 is open to remove A. F. C. from generator 1 and switch 22, already open, continues to disable the search of generator 1. Since station B's switch 16′ is open, coil 15′ is deenergized. Since station A's frequency has drifted to some freely running value, station B is not tuned to it and coil 18′ of relay 50′ is deenergized, closing switch 19′ so as to apply search voltage to generator 1′. When the generator 1′ becomes tuned to the signal at station A, coil 18′ becomes deenergized and switch 19 opens to remove the search voltage and switch 20 closes to supply an A. F. C. voltage once more.

Once again, station A has resumed control and is the master station while station B resumes the role of slave station.

Figure 4:
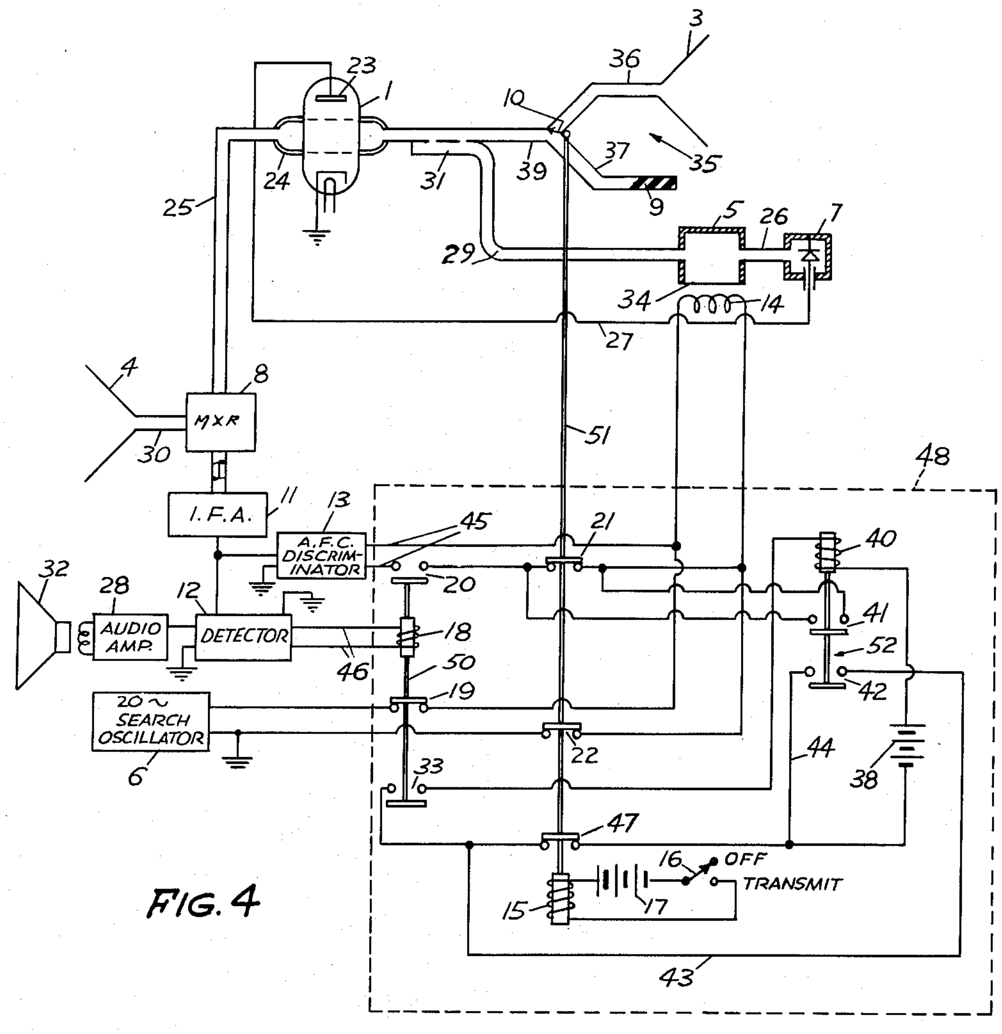
Fig. 4 is a schematic illustration of a single station of the modified basic system shown in Fig. 2.

Referring now to Fig. 4, a detailed description of a single station as used in the system of Fig. 2 is shown. An oscillation generator 1 serves the dual function of local oscillator for the receiving portion 2 of the station and as a master oscillator for the transmitting portion of the same station. As explained in connection with Fig. 2, a high Q cavity resonator 5 having a resonant frequency equal to the assigned frequency of the station is loosely coupled to generator 1 by means of a transmission line 29 so that the cavity is lightly loaded. The output of cavity 5 is connected to crystal detector 7. The detected output of cavity 5 is fed back to the repeller electrode 23 of generator 1 by a feedback connection 27. If the frequency of generator 1 drifts considerably, the output of cavity resonator 5 changes, depending on the point of the cavity resonance curve at which the generator is operated and the slope of the curve over the operating range. The voltage fed back to the repeller electrode 23 is proportional to the frequency drift of generator 1 from its center frequency. Since the frequency of the klystron generator is proportional, in turn, to the voltage at its repeller, the error voltage fed back to electrode 23 tends to return the generator to its center frequency. The stabilizing system just described is already well known and other frequency stabilizing systems may be utilized, if desired.

One wall of cavity 5 is composed of a flexible metallic diaphragm 34 which is caused to vibrate whenever coil 14 is energized, in a manner to be described later. One possible arrangement for searching or modulating cavity 5 involves the use of a typical telephone receiver minus the end cap. The telephone receiver, including a set of coils and a flexible iron diaphragm, may be screwed into an internally threaded portion of a cylindrical cavity 5 whose diameter is equal to that of the telephone receiver. Other means of varying the size of cavity resonator 5, such as motor-drive slug tuning means, are feasible and the invention is not to be limited to any particular method of tuning.

A search oscillator 6, when connected to cavity resonator searching or modulating coil 14, serves to sweep the frequency of generator 1 at a twenty-cycle rate by varying the resonant frequency of cavity resonator 5, to which the generator 1 is tied, at the same rate. An automatic frequency control voltage, derived from discriminator 13 during reception of the corresponding receiver, is also capable of being applied to cavity resonator modulating coil 14 for varying the frequency of cavity resonator 5.

The operation of the circuit of Fig. 4 is substantially identical to that of Fig. 3 except that the automatic frequency control voltage and search oscillator voltage are applied to the cavity resonator modulating coil 14 instead of directly to the repeller electrode 23 of generator 1. In view of the description already given, repetition of the detailed operation of the control circuit 48 as applied to the circuit of Fig. 4 appears unnecessary.

It will also be understood that the circuit of Fig. 4, like that of Fig. 3, represents only one station of two or more stations.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A communication system comprising a first station and a second station, either one of which is adapted to operate as a master station while the other is simultaneously operating as a slave station, each station having a transmitter and receiver and having a single generator acting both as a source of signals for the transmitter and as a local oscillator for the receiver; each station further having a control device including a switch, a first control circuit actuated by closure of said switch for effecting transmission from said station, a second control circuit actuated in response to reception of signals from the other station, and a holding circuit; a search oscillator at each station for sweeping said generator over a portion of the frequency spectrum, a source of automatic frequency control voltage at each station derived from said corresponding receiver during reception thereby of signals from the other station, first means including a portion of said first and second control circuits and responsive to opening of said switch for interconnecting said search oscillator and said generator during the simultaneous absence of transmission from said station and the absence of received signals from the other station, second means including a part of said first control means for disconnecting said search oscillator from said generator during periods of transmission, third means including a portion of said second control means for disconnecting said search oscillator from said generator during periods of reception, fourth means including portions of said first and second control circuits for applying said automatic frequency control voltage to said generator during the presence only of said received signals at the corresponding station, said holding circuit including a portion of said second control means and responsive only to simultaneous transmission by both stations for continuing to supply said automatic frequency control voltage to the generator of the station whose switch has most recently been closed and for preventing application of said automatic frequency control voltage to the generator of the other of said stations.

2. A communication system comprising a first station and a second station, either one of which is adapted to operate as a master station while the other is simultaneously operating as a slave station, each station having a transmitter and receiver and having a single generator acting both as a source of signals for the transmitter and as a local oscillator for the receiver, each station further having a control device including a switch, a first control circuit actuated by closure of said switch for effecting transmission from said station, a second control circuit actuated in response to reception of signals from the other station, and a holding circuit; a frequency reference means coupled to each generator, a search oscillator at each station for tuning said frequency reference means continuously over a frequency band, a source of automatic frequency control voltage at each station derived from said corresponding receiver during reception thereby of signals from the other station for further tuning said frequency reference means, first means including a portion of said first and second control circuits and responsive to opening of said switch for connecting said search oscillator to said frequency reference means during the simultaneous absence of transmission from said station and the absence of received signals from the other station, second means including a part of said first control means for disconnecting said search oscillator from said frequency reference means during periods of transmission, third means including a portion of said second control means for disconnecting said search oscillator from said frequency reference means during periods of reception, fourth means including portions of said first and second control circuits for applying said automatic frequency control voltage to said frequency reference means during the presence only of said received signals, said holding circuit including a portion of said second control means and responsive only to simultaneous transmission by both stations for continuing to supply said automatic frequency control voltage to said frequency reference means of the station whose switch has most recently been closed and for preventing application of said automatic frequency control voltage to the generator of the other of said stations.

3. In a communication system: a station having a transmitter and receiver and having a single generator acting both as a source of signals for the transmitter and as a local oscillator for the receiver, said station further having a control device including a switch, a first control circuit actuated by closure of said switch for effecting transmission from said station, a second control circuit actuated in response to reception of external signals from an external source, and a holding circuit; a search oscillator, a source of automatic frequency control voltage derived from said receiver during reception thereby of said external signals, first means including a portion of said first and second control circuits and responsive to opening of said switch for interconnecting said search oscillator and said generator during the simultaneous absence of transmission from said station and the absence of received signals, second means including a part of said first control means for disconnecting said search oscillator from said generator during periods of transmission, third means including a portion of said second control means for disconnecting said search oscillator from said generator during periods of reception, fourth means including portions of said first and second control circuits for applying said automatic frequency control voltage to said generator during the presence only of said received signals, said holding circuit including a portion of said first and second control means and responsive to a prior reception of external signals for maintaining said automatic frequency control voltage on said generator after said switch is closed.

4. In a communication system: a station having a transmitter and receiver and having a single generator acting both as a source of signals for the transmitter and as a local oscillator for the receiver, a frequency reference means coupled to said generator, said station further having a control device including a switch, a first control circuit actuated by closure of said switch for effecting transmission from said station, a second control circuit actuated in response to reception of external signals from an external source, and a holding circuit; a search oscillator, a source of automatic frequency control voltage derived from said receiver during reception thereby of said external signals, first means including a portion of said first and second control circuits and responsive to opening of said switch for interconnecting said search oscillator and said reference means during the simultaneous absence of transmission from said station and the absence of received signals, second means including a part of said first control means for disconnecting said search oscillator from said reference means during periods of transmission, third means including a portion of said second control means for disconnecting said search oscillator from said reference means during periods of reception, fourth means including portions of said first and second control circuits for applying said automatic frequency control voltage to said reference means during the presence only of said received signals, said holding circuit including a portion of said first and second control means and responsive to a prior reception of external signals for maintaining said automatic frequency control voltage on said frequency reference means after said switch is closed.

5. A communication system comprising a first station and a second station, either one of which is adapted to operate as a master station at any one time while the other is simultaneously operating as a slave station, each station including a transmitter and a receiver having a single generator for both transmission and reception, each station including a switch and a first relay energized by closure of said first switch to enable the corresponding station to radiate signals, a second relay at each station connected to the output of its receiver and capable of being energized upon reception of signals from the other station, a third relay adapted to be initially energized during the simultaneous de-energization of said first relay and energization of said second relay, a search oscillator at each station for deriving a sweep voltage, a source of automatic frequency control voltage derived from each receiver when signals are being received thereby, means including said energized first relay for removing said search voltage from the corresponding generator, means responsive to the de-energization of both of said first and second relays at said slave station for supplying said search voltage to said generator until a signal is picked up by the corresponding receiver, means responsive to the de-energization of said first relay and the energization of said second relay for removing said search voltage from said slave receiver and for applying said automatic frequency control voltage to said generator, means including said third relay and responsive to a previous reception for continuing to supply said automatic frequency control voltage to said generator of said slave station whenever both stations are simultaneously transmitting.

6. A communication system comprising a first station and a second station either one of which is adapted to operate as a master station while the other is simultaneously operating as a slave station, each station including a transmitter and a receiver and having a single generator acting both as a source of signals for the transmitter and as a local oscillator for the receiver, a search oscillator at each station for deriving a sweep voltage which sweeps said generator over a portion of the frequency spectrum, a source of automatic frequency control voltage at each station derived from said corresponding receiver during reception thereby of signals from said other station, first control means at each station including a switch, means responsive to closure of said switch for effecting transmission from said station and for removing said search oscillator sweep voltage from said generator, second control means at each station initially energized during simultaneously transmission by both stations, means including the second control means of that station whose switch has more recently been closed for continuing to apply said automatic frequency control voltage to the generator frequency reference means of that station whose switch has more recently been closed and means including the second control means of the other of said stations for preventing the application of said automatic frequency control voltage to the generator of the other of said stations during simultaneous transmission by both stations.

7. A communication system comprising a first station and a second station either one of which is adapted to operate as a master station while the other is simultaneously operating as a slave station, each station including a transmitter and a receiver and having a single generator acting both as a source of signals for the transmitter and as a local oscillator for the receiver, a search oscillator at each station for deriving a sweep voltage which sweeps said generator over a portion of the frequency spectrum, a source of automatic frequency control voltage at each station derived from said corresponding receiver during reception thereby of signals from said other station, first control means at each station including a switch, means responsive to closure of said switch for effecting transmission from said station and for removing said search oscillator sweep voltage from said generator, second control means at each station initially energized during the simultaneous opening of said switch and reception of signals from the other of said stations, means responsive to energization of said second control means for continuing to apply said automatic frequency control voltage to said generator during simultaneous transmission from both stations, said second control means at the station which alone is transmitting at any instant being de-energized during the absence of reception from the other of said stations, means responsive to de-energization of said second control means for preventing the application of said automatic frequency control voltage to said corresponding generator during simultaneous transmission from both stations.

8. A communication system comprising a first station and a second station either one of which is adapted to operate as a master station while the other is simultaneously operating as a slave station, each station including a transmitter and a receiver and having a single generator acting both as a source of signals for the transmitter and as a local oscillator for the receiver, a frequency reference means coupled to said generator, a search oscillator at each station for deriving a sweep voltage sweeping said generator over a portion of the frequency spectrum, a source of automatic frequency control voltage at each station derived from said corresponding receiver during reception thereby of signals from said other station, first control means at each station including a switch, means responsive to closure of said switch for effecting transmission from said station and for removing said search oscillator sweep voltage from said frequency reference means, second control means at each station initially energized during the simultaneous opening of said switch and reception of signals from the other of said stations, means responsive to energization of said second control means for continuing to apply said automatic frequency control voltage to said frequency reference means during simultaneous transmission from both stations, said second control means at the station which alone is transmitting at any instant being de-energized during the absence of reception from the other of said stations, means responsive to de-energization of said second control means for preventing the application of said automatic frequency control voltage to said corresponding frequency reference means during simultaneous transmission from both stations.

9. A communication system comprising a first station and a second station either one of which is adapted to operate as a master station while the other is simultaneously operating as a slave station, each station including a transmitter and a receiver and having a single generator acting both as a source of signals for the transmitter and as a local oscillator for the receiver, a search oscillator at each station for deriving a sweep voltage which sweeps said generator over a portion of the frequency spectrum, a source of automatic frequency control voltage at each station derived from said corresponding receiver during reception thereby of signals from said other station, first control means at each station having a main switch and a first switching element disposed between said source of automatic frequency control voltage and said generator, second control means including a second switching element shunting said first switching element during energization of said second control means, said first control means responsive to closure of said main switch for effecting transmission from said station and for removing said search oscillator sweep voltage from said generator, said first control means further responsive to closure of said main switch for opening said first switching element and removing said automatic frequency control voltage from said generator during transmission from said station only, said second control means at each station initially energized during the simultaneous opening of said main switch and reception of signals from the other of said stations, said second control means responsive to energization thereof for continuing to apply said automatic frequency control voltage to said generator during simultaneous transmission from both stations, and said second control means further responsive to de-energization thereof for preventing the application of said automatic frequency control voltage to said corresponding generator during simultaneous transmission from both stations.

10. A communication system comprising a first station and a second station either one of which is adapted to operate as a master station while the other is simultaneously operating as a slave station, each station including a transmitter and a receiver and having a single generator acting both as a source of signals for the transmitter and as a local oscillator for the receiver, a frequency reference means coupled to said generator, a search oscillator at each station for deriving a sweep voltage sweeping said generator over a portion of the frequency spectrum, a source of automatic frequency control voltage at each station derived from said corresponding receiver during reception thereby of signals from said other station, first control means at each station having a main switch and a first switching element disposed between said source of automatic frequency control voltage and said frequency reference means, second control means including a second switching element shunting said first switching element during energization of said second control means, said first control means responsive to closure of said main switch for effecting transmission from said station and for removing said search oscillator said sweep voltage from said frequency reference means, said first control means further responsive to closure of said main switch for opening said first switching element and removing said automatic frequency control voltage from said frequency reference means during transmission from said station only, said second control means at each station initially energized during the simultaneous opening of said main switch and reception of signals from the other of said stations, said second control means responsive to energization thereof for continuing to apply said automatic frequency control voltage to said frequency reference means during simultaneous transmission from both stations, and said second control means further responsive to de-energization thereof for preventing the application of said automatic frequency control voltage to said corresponding frequency reference means during simultaneous transmission from both stations.

References Cited in the file of this patent

UNITED STATES PATENTS

| | | |
|---|---|---|
| 1,784,867 | Farington | Dec. 16, 1930 |
| 2,287,925 | White | June 30, 1942 |
| 2,333,719 | Herold | Nov. 9, 1943 |
| 2,433,290 | Mitchell et al. | Dec. 23, 1947 |
| 2,468,029 | Bruck | Apr. 26, 1949 |
| 2,479,701 | Ress | Aug. 23, 1949 |
| 2,486,551 | Boothroyd | Nov. 1, 1949 |
| 2,547,159 | Guenard | Apr. 3, 1951 |
| 2,643,329 | Silver | June 23, 1953 |